United States Patent [19]
Lee

[11] Patent Number: 5,986,437
[45] Date of Patent: Nov. 16, 1999

[54] POWER SUPPLY SYSTEM FOR PORTABLE ELECTRONIC DEVICES

[75] Inventor: Chang-Hum Lee, Anyang-shi, Rep. of Korea

[73] Assignee: SamSung Electronics Co., Ltd., Suwon, Japan

[21] Appl. No.: 08/992,098

[22] Filed: Dec. 17, 1997

[30] Foreign Application Priority Data

Dec. 17, 1996 [KR] Rep. of Korea ................ 96-66818

[51] Int. Cl.$^6$ .................................................. H02J 7/00
[52] U.S. Cl. ........................................ 320/162; 320/125
[58] Field of Search ................................. 320/161, 162, 320/163, 125

[56] References Cited

U.S. PATENT DOCUMENTS

| | | |
|---|---|---|
| 4,843,299 | 6/1989 | Hutchings . |
| 5,049,804 | 9/1991 | Hutchings . |
| 5,150,031 | 9/1992 | James et al. . |
| 5,168,205 | 12/1992 | Kan et al. . |
| 5,175,485 | 12/1992 | Joo . |
| 5,241,259 | 8/1993 | Patino et al. . |
| 5,382,893 | 1/1995 | Dehnel . |
| 5,411,816 | 5/1995 | Patino . |
| 5,465,039 | 11/1995 | Narita et al. . |
| 5,479,083 | 12/1995 | Brainard . |
| 5,481,175 | 1/1996 | Qualich et al. . |
| 5,541,490 | 7/1996 | Sengupta et al. . |
| 5,541,492 | 7/1996 | Fernandez et al. . |
| 5,561,361 | 10/1996 | Sengupta et al. . |
| 5,568,038 | 10/1996 | Tatsumi . |
| 5,592,069 | 1/1997 | Dias et al. . |
| 5,625,275 | 4/1997 | Tanikawa et al. . |
| 5,637,981 | 6/1997 | Nagai et al. . |
| 5,642,029 | 6/1997 | Seragnoli . |
| 5,739,667 | 4/1998 | Matsuda et al. .............. 320/162 |

*Primary Examiner*—Peter S. Wong
*Assistant Examiner*—K. Shin
*Attorney, Agent, or Firm*—Robert E. Bushnell, Esq.

[57] ABSTRACT

A power supply system for a portable device such as portable personal computer, to be operated from a DC power source supplied from a rechargeable battery or an AC adapter includes: an input current detecting circuit for detecting an input current supplied from the AC adapter and for generating a detection signal having a magnitude which varies depending upon the input current, and a charging current control circuit for controlling the amount of the charging current in response to the detection signal. The power supply system has low power losses and effects a high efficiency battery charging.

6 Claims, 5 Drawing Sheets

POWER SUPPLY SYSTEM FOR PORTABLE ELECTRONIC DEVICES

CLAIM OF PRIORITY

This application makes reference to, incorporates the same herein, and claims all benefits accruing under 35 U.S.C. §119 from an application for POWER SUPPLY SYSTEM FOR PORTABLE ELECTRONIC DEVICES earlier filed in the Korean Industrial Property Office on Oct. 17, 1996 and there duly assigned Serial No. 66818/1996.

BACKGROUND OF THE INVENTION

1. Field of the Invention

The present invention generally relates to a power supply system for portable electronic devices provided with rechargeable batteries, and more particularly, to a system for charging a rechargeable battery in a portable computer.

2. Related Art

Rechargeable batteries are commonly used to supply power to portable electronic devices, such as personal computers, wordprocessors, a variety of portable handsets and so on when conventional power outlets are not available. An AC (alternating current) adapter is also typically provided to power a portable device when the user does have access to a power outlet. The AC adapter further provides power to a battery charging circuit, which recharges the batteries, of the portable device.

When a rechargeable battery is used as a power supply system for portable personal computers as disclosed, for example, in U.S. Pat. No. 5,561,361 for Computer Power Supply And Battery Recharging System issued to Sengupta et al., the battery may be charged by the battery charger in two different charging modes, that is, a run and charging mode and a run or charging mode. During the run and charging mode, the battery is charged regardless whether the computer is operating or not, and as a result, the charging operation may be difficult to control. In contrast to the run and charging mode, the run or charging mode allows the battery to be charged selectively depending upon whether or not the computer is operating.

Generally, charging operations of such a battery may be classified into four modes, that is, a fast or rapid charging, a quick charging, a standard charging and a trickle charging, in relation to the charging capacities or charging current of the battery. In the fast charge mode, a relatively large charging current (e.g., about 2 amperes or so) is supplied to a battery over a relatively short period of time (e.g., one or two hours). In the quick charge mode, a relatively large charging current ( e.g., about 1 ampere to high hundreds of milliamperes or so) is supplied to the battery over a relatively short period of time (e.g., four to six hours). In the standard charge mode, a relatively small charging current (e.g., about low hundreds of milliamperes or so) is supplied to the battery over a relatively long period of time (e.g. eight to ten hours). In the trickle charge mode, the battery charging circuit provides a relatively even smaller constant current (e.g., about 100 milliamperes or so) to the battery without interruption. In this mode, the battery may not be charged but its power loss due to natural discharge is compensated for. During all the charging operations, the charge level of the battery is monitored so that, when the battery reaches its maximum charge level, the charging operation is terminated in order to prevent overcharging and damage of the battery. Exemplars of contemporary battery chargers are disclosed in U.S. Pat. Nos. 4,843,299 and 5,049,804 for Universal Battery Charging System issued to Hutchings, U.S. Pat. No. 5,168,205 for Method And Apparatus For Charging A Battery In High Amp And Automatic Charging Modes issued to Kan et al., U.S. Pat. No. 5,175,485 for Apparatus For Controlling Charging Of A Storage Battery issued to Joo, U.S. Pat. No. 5,241,259 for Method and Apparatus For Rapidly Charging A Battery At High Temperature issued to Patino et al., U.S. Pat. No. 5,411,816 for Method And Apparatus For Determining Battery Characteristics issued to Patino, U.S. Pat. No. 5,479,083 for Non-Dissipative Battery Charger Equalizer issued to Brainard, U.S. Pat. No. 5,541,492 for Method For Charging A Multiple Voltage Electrochemical Cell issued to Fernandez et al., U.S. Pat. No. 5,592,069 for Battery Charger issued to Dias et al., U.S. Pat. No. 5,637,981 for Method For Charging A Secondary Battery And Charge Used Therefor Using Constant Current And Constant Voltage issued to Nagai et al., and the co-pending Korean application Ser. No. 96-45546 filed by the present applicant.

The following additional patents each disclose features in common with the present invention: U.S. Pat. No. 5,465,039 to Power Supply For Electronic Device, And Electronic Device System issued to Narita et al., U.S. Pat. No. 5,625,275 for Power Supply Which Provides A Variable Charging Current To A Battery In A Portable Computer System issued to Tanikawa et al., U.S. Pat. No. 5,481,175 for System And Method For Charging Auxiliary Batteries issued to Qualich et al., U.S. Pat. No. 5,462,029 for Constant Current Battery Charger With Auxiliary Output For Portable Apparatus issued to Seragnoli, U.S. Pat. No. 5,541,490 for Computer Power Supply System, issued to Sengupta et al., U.S. Pat. No. 5,568,038 for Portable Electric Equipment And Rechargeable Built-In Batteries issued to Tatsumi, U.S. Pat. No. 5,382,893 for Maximum Power Regulated Battery Charger issued to Dehnel, and U.S. Pat. No. 5,150,031 for Battery Charging System issued to James et al.

SUMMARY OF THE INVENTION

Accordingly, it is an object of the present invention to provide a novel power supply system for a portable electronic device having a rechargeable battery, which adjusts the battery charging current depending upon the current consumed by the portable device.

It is another object of the invention to provide a portable device power supply system having low power loss and high efficiency battery charging.

It is still another object of the invention to provide a portable device power supply system capable of charging a rechargeable battery faster and reducing the charging time of the battery without enlarging the size of an AC adapter.

These and other objects of the present invention can be achieved by a power supply system for a portable electronic device operable on an internal rechargeable battery, which comprises: an AC adapter for supplying a variable amount of input power including a variable amount of system power for operating the portable device and a variable amount of charging power for charging the battery, a battery charging circuit for supplying a variable amount of charging current flowing through the output terminal to the battery, an input current detecting circuit for detecting an input current supplied from the AC adapter and for generating a detection signal having a magnitude which varies depending upon the input current, and a charging current control circuit for controlling the amount of the charging current in response to the detection signal.

In an embodiment, the charging current control circuit controls the charging current so as to be constant when the amplitude of the detection signal is less than a predetermined threshold level, and so as to decrease the amount of the charging current depending upon the amplitude of the detection signal when the amplitude of the detection signal is not less than the predetermined threshold level.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

While the invention has been described in terms of an exemplary embodiment, it is contemplated that it may be practiced as outlined above with modifications within the spirit and scope of the appended claims.

Figure 1:
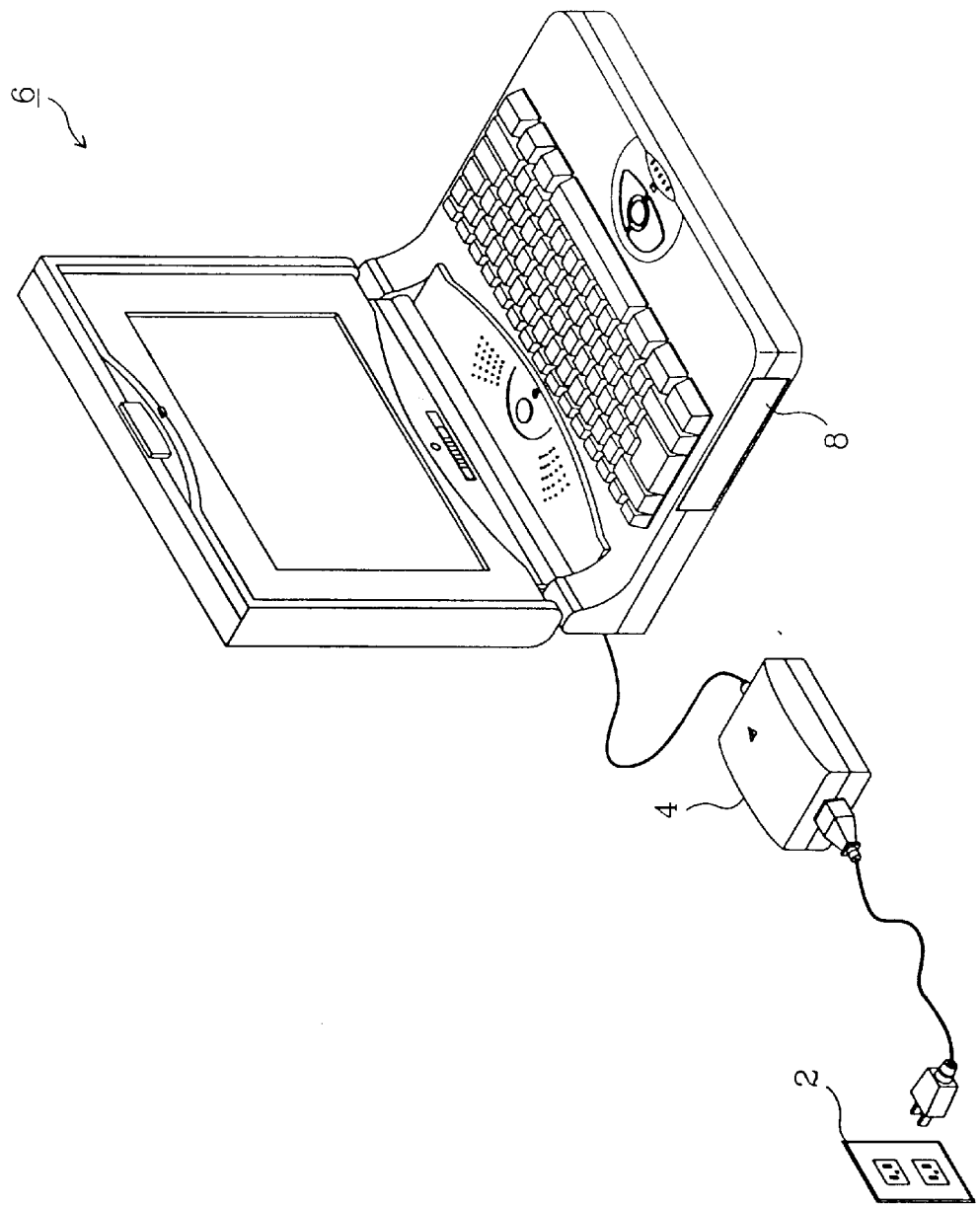
FIG. 1 is a schematic drawing showing an exemplary portable electronic device operable on a battery.

FIG. 1 is a schematic drawing showing an exemplary portable electronic device operable on a battery as noted in the Background of the Invention above. Rechargeable batteries 8 are commonly used to power portable electronic devices 6 such as personal computers, wordprocessors, a variety of portable handsets and so on when conventional power outlets 2 are not available. An AC adapter 4 is also typically provided to power a portable device when the user does have access to a power outlet 2. The AC adaptor further provides power to a battery charging circuit which recharges the batteries 8 of the portable device.

Figure 2:
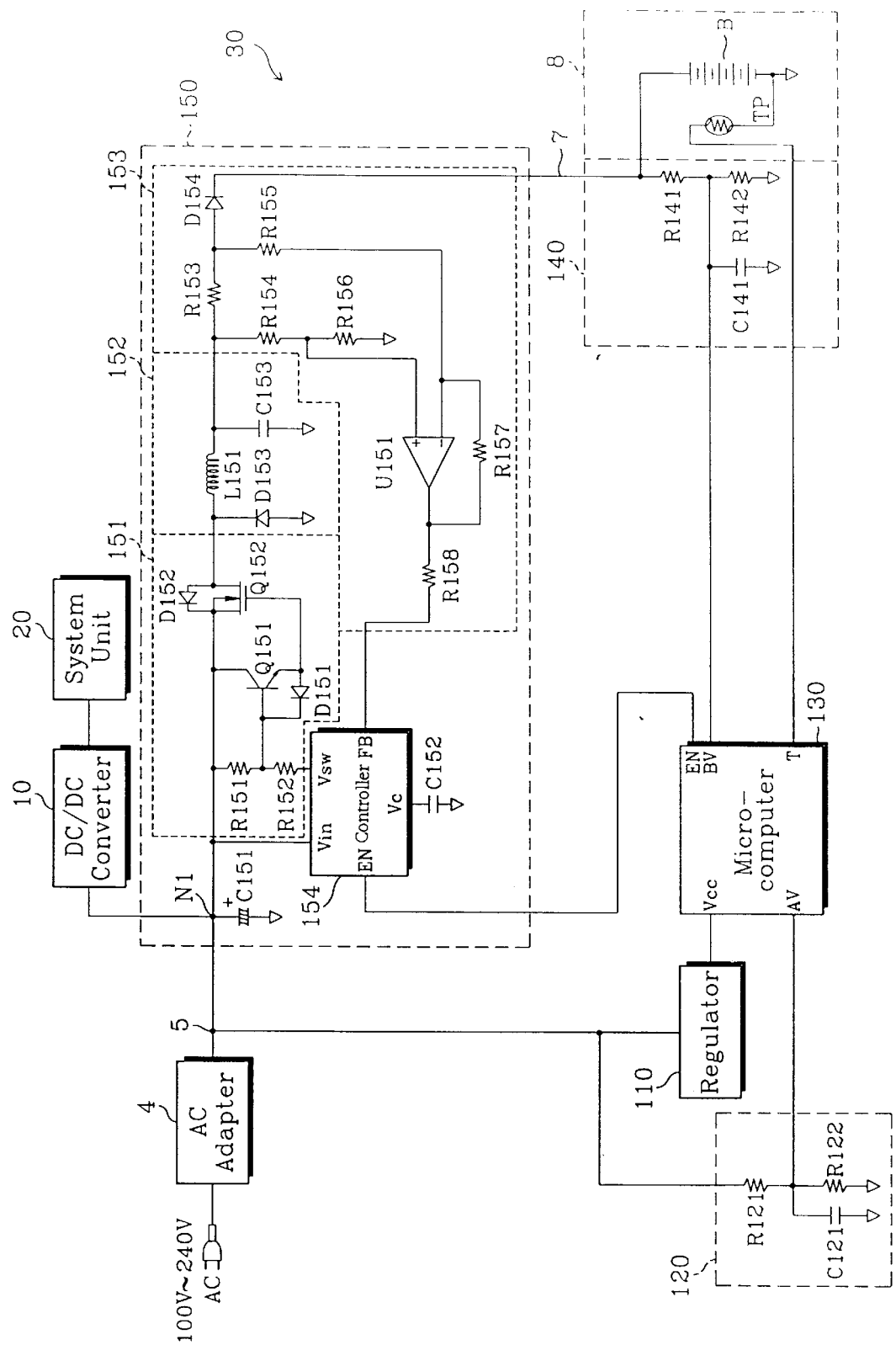
FIG. 2 is a circuit diagram of an earlier portable device power supply system having a battery IS charging circuit for charging a rechargeable battery.

FIG. 2 illustrates a power supply system for portable computers. Referring to FIG. 2, the portable computer power supply system includes an AC adapter 4 which converts AC voltage to a stable DC (direct current) voltage. The AC adapter 4 is connected to a DC/DC converter 10. The DC/DC converter 10 operates in a conventional manner to supply power for operating a system unit 20 of the portable computer system having various components. The AC adapter 4 is also connected to a battery charging circuit 30 for recharging a battery pack 8. The battery charging circuit 30 includes a microcomputer 130 for controlling the overall charging operation of the battery pack 8. This microcomputer 130 is supplied with power by a regulator circuit 110. The battery charging circuit 30 further includes an adapter voltage detecting circuit 120, a battery voltage detecting circuit 140, and a constant current charging control circuit 150.

The constant current charging control circuit 150 includes a switching circuit 151, an energy storing circuit 152 for storing the electrical energy coming from the switching circuit 151, a charging current detecting circuit 153 for detecting the charging current that flows from the switching circuit 151 to the battery pack 8 using the voltage drop across the resistor RI 53 and outputting a current detection signal having an amplitude corresponding to the detected current, and a pulse width modulation (PWM) switching controller 154 which controls the ON/OFF time of the transistor Q152 within the switching circuit 151 by outputting a pulse signal which has a duty cycle corresponding to the voltage level of its feedback terminal FB connected to the output terminal of the charging current detecting circuit 153. The charging current flowing from the input terminal 5 to the output terminal 7 is controlled according to the control voltage which is inputted to the feedback terminal FB of the PWM controller 154.

In most portable computer systems, the batteries may be charged in two charging modes, that is, the fast charging mode when the computer systems are powered off and the quick charging mode when powered on. The computer power supply system thus supplies two constant levels of battery charging current. To ensure that there is always sufficient current available for charging the battery when the computer system is operating, the level of the charging current outputted by the battery charger must be selected in accordance with the maximum current which could be drawn by the system. Therefore, the AC adapter must be designed for the situation in which the computer is using maximum power.

Figure 3:
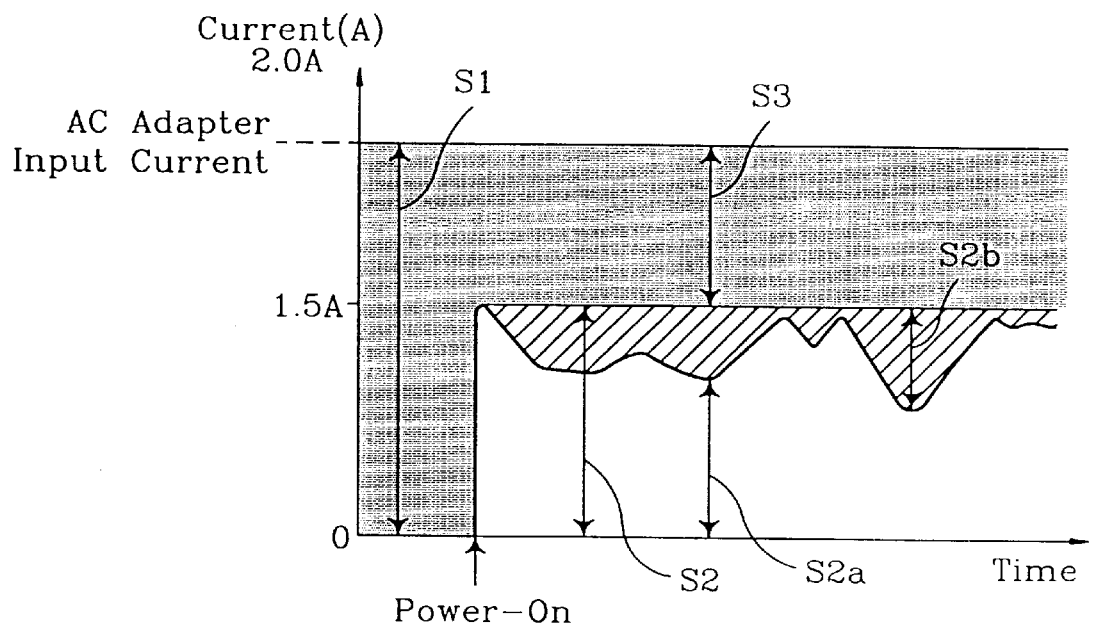
FIG. 3 is a schematic representation illustrating a typical battery charging operation of the earlier power supply system.

FIG. 3 is a schematic representation which illustrates a typical battery charging operation of such a computer power supply system. Referring to FIG. 3, all of the input current S1 from the AC adapter 4 is used for charging the battery 8 until the system unit 20 is turned on. When the system unit 20 is turned on, the charging current is decreased to a constant current S3, considering a maximum system current S2 drawn by the system unit 20.

However, the system unit 20 does not always consume its maximum current S2 when it is operating. That is, the current S2a consumed by the system unit 20 varies in accordance with the operating status of the system unit 20. In the power supply system, thus, there is a remainder S2b of the current that is not used by either the system unit 20 or the battery charging circuit 30. As a result, a power loss and inefficient battery charging in the power system occur. If it is also intended to charge the battery faster, the size of the AC adapter must be larger and heavier than necessary for typical operation. This adapter may be therefore be unsuitable for portable devices.

Figure 4:
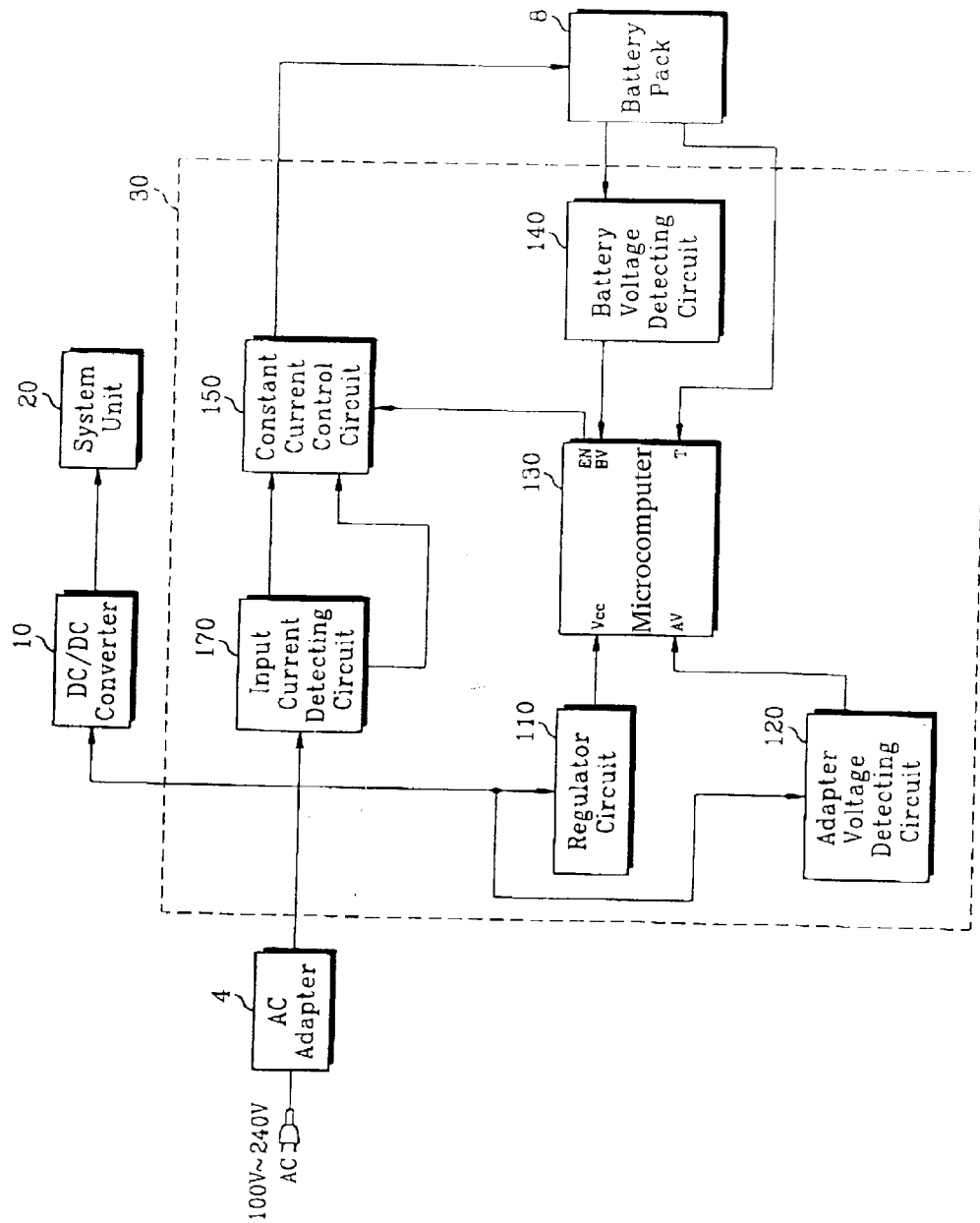
FIG. 4 is a block diagram and FIG. 5 is a detailed circuit diagram of a novel portable device power supply system according to a preferred embodiment of the present invention.
Figure 5:
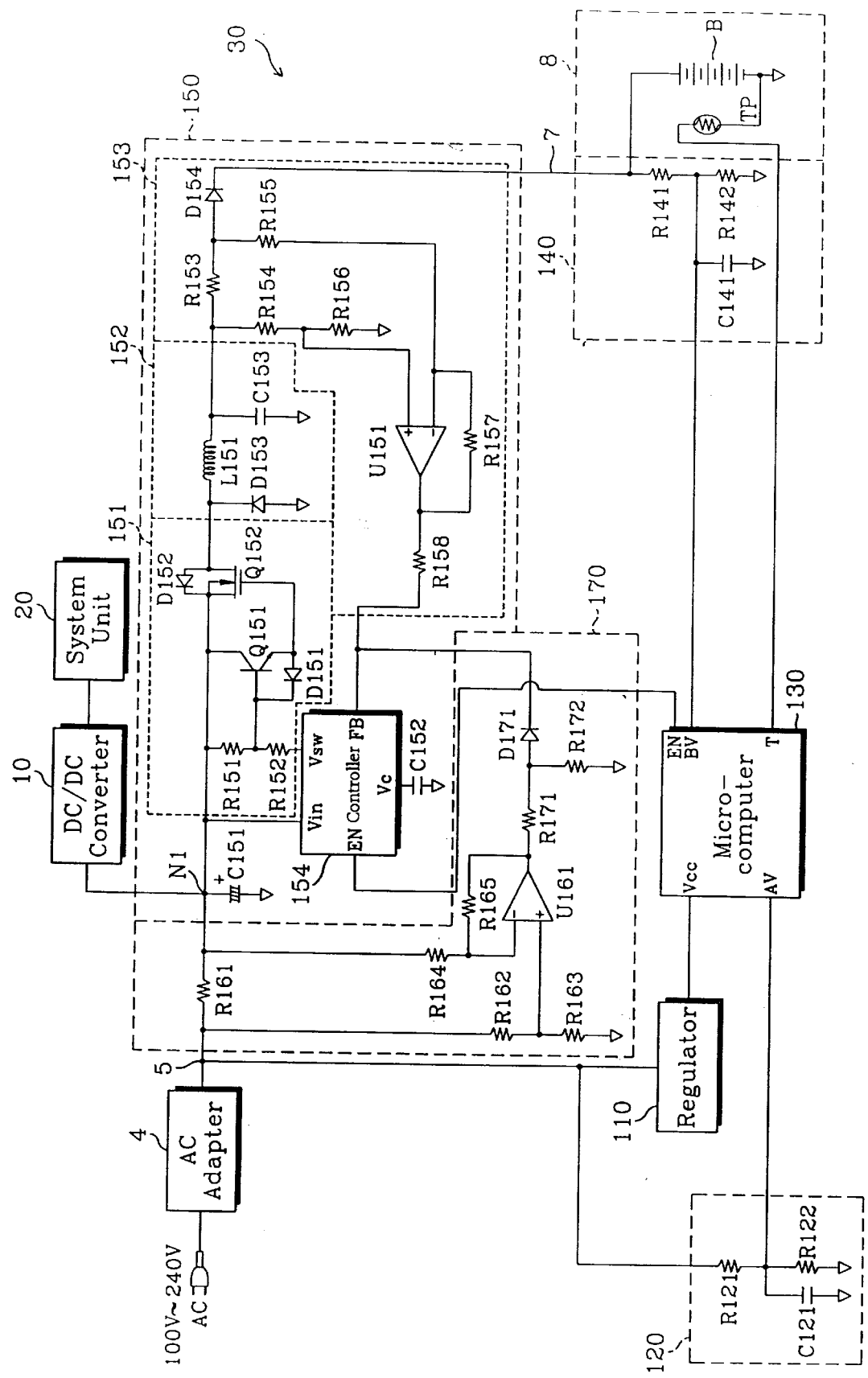

FIGS. 4 and 5 illustrate a power supply system according to a preferred embodiment of the present invention. The power supply system is suitable for a portable computer to be operated from a DC power source supplied from a rechargeable battery or an AC adapter. Referring to FIGS. 4 and 5, the power supply system includes an AC adapter 4 for supplying an amount of DC power (e.g., 24 to 30 watts) to a portable computer. In a common portable computer system, the AC converter, for example, converts an AC voltage of 100 to 240 volts to a stable DC (direct current) voltage of about 12 to 15 volts.

The power supply system further comprises a DC/DC converter 10 for supplying a variety of operating voltages necessary for a system unit 20 of the portable computer having various components and a battery charging circuit 30 for charging a rechargeable battery pack 8.

The battery charging circuit 30 has an input terminal 5 connected to the AC adapter 4, a node N1 connected to the DC/DC converter 10 and an output terminal 7 connected to the battery pack 8. In the battery charging circuit 30, a microcomputer 130 is provided to control the overall charging operation of the battery pack 8. This microcomputer 130 is supplied with power by a regulator circuit 110. The battery charging circuit 30 further includes an adapter voltage detecting circuit 120 composed of the resistors R121 and R122, and the capacitor C121, a battery voltage detecting circuit 140 composed of the resistors R141 and R142, and the capacitor C141, and a constant current charging control circuit 150. The adapter voltage detecting circuit 120 and the battery voltage detecting circuit 140 detect the output voltages of the AC adapter 4 and the battery pack 8 and generate an adapter voltage detection signal and a battery voltage detection signal, respectively, which are supplied to the microcomputer 130. The microcomputer 130 controls the operation of the constant current control circuit 150 in response to the detection signals. In particular, when the battery voltage reaches a predetermined voltage, the microcomputer 130 terminates the battery charging to protect the battery from damage due to overcharging. The microcomputer 130 also controls the operation of the constant current control circuit 150 in accordance with the ambient temperature of the battery pack 8 which is detected via a temperature-sensitive resistor TP within the battery pack 8.

As shown in FIGS. 4 and 5, the constant current charging control circuit 150 includes a switching circuit 151, an energy storing circuit 152, a charging current detecting circuit 153, and a pulse width modulation (PWM) switching controller 154. The switching circuit 151 is composed of the resistors R151 and R152, the diodes D151 and D152, and the transistors Q151 and Q152, and is provided to supply a variable amount of charging current to the battery pack 8. The PWM switching controller 154 controls the ON/OFF time of the transistor Q152 within the switching circuit 151 by outputting a pulse signal which has a duty cycle corresponding to the voltage level of its feedback terminal FB.

The energy storing unit 152, composed of the inductor L151, the diode D153 and the capacitor C153 is provided to store the electrical energy coming from the switching circuit 151.

The charging current detecting circuit 153 is connected between the energy storing circuit 152 and the battery pack 8. The charging current detecting circuit 153 has a resistor R153 for detecting the charging current and an amplifier circuit composed of resistors R152~R158, the diode D154 and the operational amplifier U151. The resistor R153 has a resistance of several hundreds millions. The amplifier circuit amplifies the voltage drop across the resistor R153 and generates a charging current detection signal. In other words, the detecting circuit 153 detects the charging current flowing from the switching circuit 151 to the battery pack 8 using the voltage dropped by the current detecting resistor R153 and outputs to the feedback terminal FB of the PWM controller 154 the charging current detection signal having an amplitude corresponding to the detected current.

The battery charging circuit further includes an input current detecting circuit 170 which is placed between the AC adapter 4 and the constant charging current control circuit 150. The input current detecting circuit 170 has a current detecting resistor R161 connected between the input terminal 5 and the node N1, and an amplifier circuit which is composed of the resistors R162~R172, the diode D171 and the operational amplifier U161. The resistor R161 has a resistance of several millions to tens of millions to reduce power loss as much as possible. The amplifier circuit amplifies the voltage drop across the resistor R161 and generates an input current detection signal. Consequently, the input current detecting circuit 170 detects a variable amount of input current flowing from the input terminal 5 to the node N1 and generates the input current detection signal 8 having a magnitude that varies depending upon the input current from the AC adapter 4.

Figure 6:
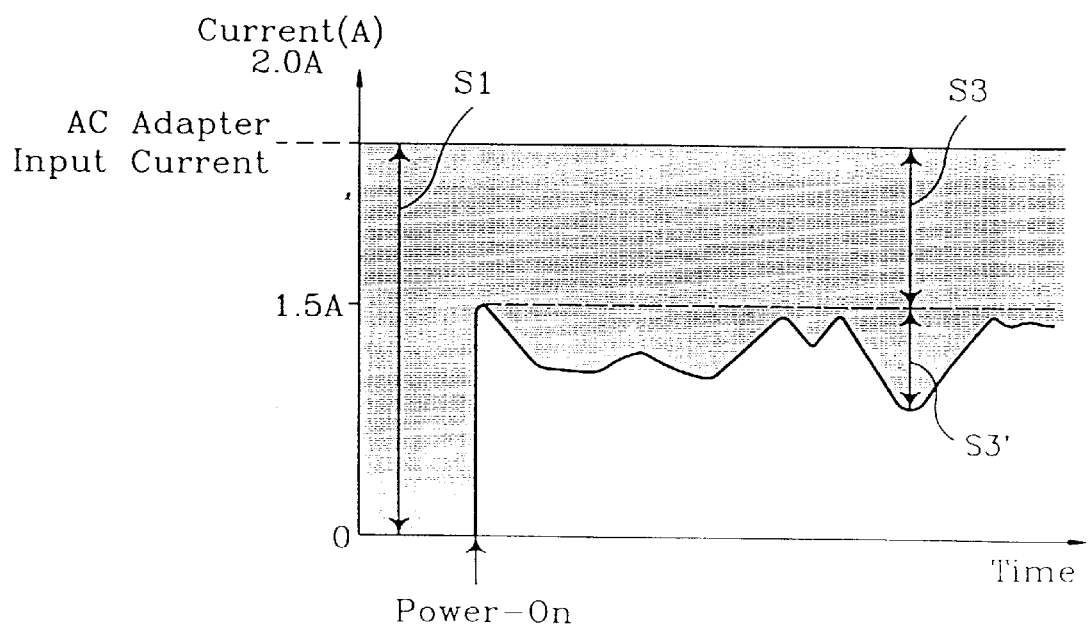
FIG. 6 is a schematic representation illustrating the charging operation of the power supply system of FIGS. 4 and 5.

FIG. 6 is a schematic representation which illustrates a battery charging operation of the power supply system of FIGS. 4 and 5.

Referring to FIG. 6, all of the input current, i.e., a rated current S1 (e.g., 2 A) of the AC adapter 4 is used for charging the battery 8 until the system unit 20 is turned on.

When the system unit 20 is powered on and the input current does not exceed the rated current of the AC adapter 4, namely, the sum of system current drawn by the system unit 20 and the charging current drawn by the battery charging circuit 30 is not greater than the rated current of the AC adapter, the charging current detecting circuit 153 supplies a fixed voltage level of the charging current detection signal to the feedback terminal FB of the PWM controller 154. Therefore, the constant charging current control circuit 150 supplies a predetermined charging current S3+S3' (e.g., about 1.0~1.5 A) to the battery pack 8.

On the other hand, when the system current drawn by the system unit 20 is increased, the input current does exceed the rated current of the AC adapter 4. Thus, the voltage level of the feedback terminal FB of the PWM controller 154 is increased so that the constant charging current control circuit 150 decreases the charging current supplied to the battery pack 8. At this time, the charging current is decreased in proportion to the increment of input current due to the increment of the system current consumed by the system unit 20. For example, if the rated current of the AC adpter is 2.0 A and the system current consumed by the system unit 20 is 1.0 A, the constant charging current control circuit 150 will supply 1.0 A of the charging current to the battery pack 8. Under the same condition, if the system unit 20 consumes 0.5A of the system current, the constant charging current control circuit 15 will supply 1.5 A of the charging current to the battery pack 8. Like this, the input current will retain the magnitude of the rated current of the AC adapter until the batter charging is terminated. Also, if the charging current no longer is supplied to the battery pack because of the termination of the battery charging, the input current will retain below the rated current of the AC adapter.

According to the invention as described above, when the current drawn by the portable device is less than its maximum S2, the remainder S3' of the current can be used for charging the battery. This allows the AC adapter to be smaller and less heavy, and maximizes the battery charging efficiency. Also, the portable device power supply system according to the present invention has low power losses and effects high efficiency battery charging, compared to the earlier systems, and further, it can charge the battery faster and reduce the charging time of the battery.

Although the preferred embodiment of the present invention has been described and illustrated above, those skilled in the art will appreciate that various changes and modifications to the present invention do not depart from the spirit of the invention.

What is claimed is:

1. A system for charging a rechargeable battery used to supply power to a portable device, comprising:

an input terminal for receiving an externally supplied variable amount of input power, the input power including a variable amount of system power for operating said portable device and a variable amount of charging power for charging said battery;

a means for supplying the system power to said portable device;

an output terminal connected to said battery;

a means for supplying a variable amount of charging current flowing through said output terminal to the battery;

a means for detecting an input current flowing through said input terminal and for generating a detection signal having a magnitude which varies depending upon the input current; and a means for controlling the amount of the charging current in response to the detection signal, said means for controlling the charging current controlling the charging current so as to be constant when the amplitude of the detection signal is less than a predetermined threshold level, and so as to decrease the amount of charging current depending upon the amplitude of the detection signal when the amplitude of the detection signal is not less than the predetermined threshold level.

2. A system for charging a rechargeable battery used to supply power to a portable device, comprising:

an AC adapter for supplying a variable amount of input current including a variable amount of system current for operating said portable device and a variable amount of charging current for charging said battery;

a first current detecting circuit for detecting the amount of charging current and for generating a first detection signal having a magnitude which varies depending upon the charging current;

a second current detecting circuit for detecting the amount of input current and for generating a second detection signal having a magnitude which varies depending upon the input current; and a charging current control circuit for controlling the amount of the charging current in response to the first and second detection signals, the charging current control circuit including an input terminal connected to said AC adapter, a node for supplying the system current to said portable device and an output terminal connected to said battery, the control circuit controlling the charging current so as to be constant when the amplitude of the second detection signal is less than a predetermined threshold level, and so as to decrease the amount of charging current depending upon the amplitude of the second detection signal when the amplitude of the second detection signal is not less than the predetermined threshold level.

3. The system according to claim 2, said charging current control means comprising a switch element connected between said node and said output terminal, and a switch control circuit for controlling ON/OFF time of said switch element in response to the first and second detection signals.

4. The system according to claim 2, said first current detecting circuit comprising a resistor connected between said node and said output terminal, and an amplifier circuit for amplifying a voltage drop across said resistor in accordance with a predetermined gain and for generating an output signal of the amplified voltage drop as the first detection signal.

5. The system according to claim 2, said second current detecting circuit comprising a resistor connected between said input terminal and said node, and an amplifier circuit for amplifying a voltage drop across said resistor in accordance with a predetermined gain and for generating an output signal of the amplified voltage drop as the second detection signal.

6. A power supply for a portable computer system operable on an internal rechargeable battery, comprising:

an AC adapter for supplying a variable amount of DC power including a variable amount of system power for operating said portable computer system and a variable amount of charging power for charging said battery;

a DC/DC converter for supplying a variety of operating voltages necessary for said system unit using the system power; and a battery charging circuit for charging said battery using the charging power;

said battery charging circuit comprising:
an input terminal connected to said AC adapter;
an output terminal connected to said battery;
a means for supplying a variable amount of charging current through said output terminal to said battery;
a means for detecting input current flowing from said AC adapter to said input terminal and for generating a detection signal having a magnitude which varies depending upon the input current; and
a means for controlling the amount of the charging current in response to the detection signal, said means for controlling the charging current controlling the charging current so as to be constant when the amplitude of the detection signal is less than a predetermined threshold level, and so as to decrease the amount of charging current depending upon the amplitude of the detection signal when the amplitude of the detection signal is not less than the predetermined threshold level.

* * * * *